United States Patent [19]
Kuster et al.

[11] Patent Number: 4,874,418
[45] Date of Patent: Oct. 17, 1989

[54] BLOW BOX FOR GLASS TEMPERING

[75] Inventors: Hans-Werner Kuster, Aachen, Fed. Rep. of Germany; Herbert Radermacher, Raeren; Luc Vanaschen, Eupen, both of Belgium

[73] Assignee: Saint-Gobain Vitrage "Les Miroirs", Courbevoie, France

[21] Appl. No.: 231,390

[22] Filed: Aug. 12, 1988

Related U.S. Application Data

[62] Division of Ser. No. 39,026, Apr. 16, 1987, Pat. No. 4,816,058.

[30] Foreign Application Priority Data

Apr. 16, 1986 [DE] Fed. Rep. of Germany ..... 36127205

[51] Int. Cl.$^4$ ............................................. C03B 27/04
[52] U.S. Cl. ......................................... 65/348; 65/351; 65/161; 239/506; 239/512; 239/524
[58] Field of Search ................. 65/115, 161, 348, 351; 239/436, 506, 512, 524

[56] References Cited

U.S. PATENT DOCUMENTS

| 1,193,086 | 8/1916 | Thomsen | 239/436 |
| 3,251,670 | 5/1966 | Acloque | 65/115 X |
| 4,022,604 | 5/1977 | Dawson | 65/348 |
| 4,400,194 | 8/1983 | Starr | 65/348 X |
| 4,444,579 | 4/1984 | Dunn | 65/351 |
| 4,816,058 | 3/1989 | Kuster et al. | 65/348 |

FOREIGN PATENT DOCUMENTS 0434489  4/1948  Italy ........................ 65/348

Primary Examiner—Arthur Kellogg
Attorney, Agent, or Firm—Oblon, Spivak, McClelland, Maier & Neustadt

[57] ABSTRACT

A blow box for the thermal tempering of panes of glass. To temper different sizes of glass, the air supply to selected blow tubes or blow tube groups in a blow box having a blow nozzle field disposed to handle relatively large panes of glass is blocked in the edge areas of the blow box, and in this manner the blow nozzle field supplied with forced air is adapted to the shape and size of the glass pane to be tempered. The adaptation of the blow nozzle field to the shape and size of the glass panes takes place, for example, with the aid of a template-like slide block having an opening corresponding to the glass pane, which slide block is arranged inside the air distributing box immediately in front of the front plate provided with the nozzle pipelets and which can be exchanged for a different slide block.

2 Claims, 6 Drawing Sheets

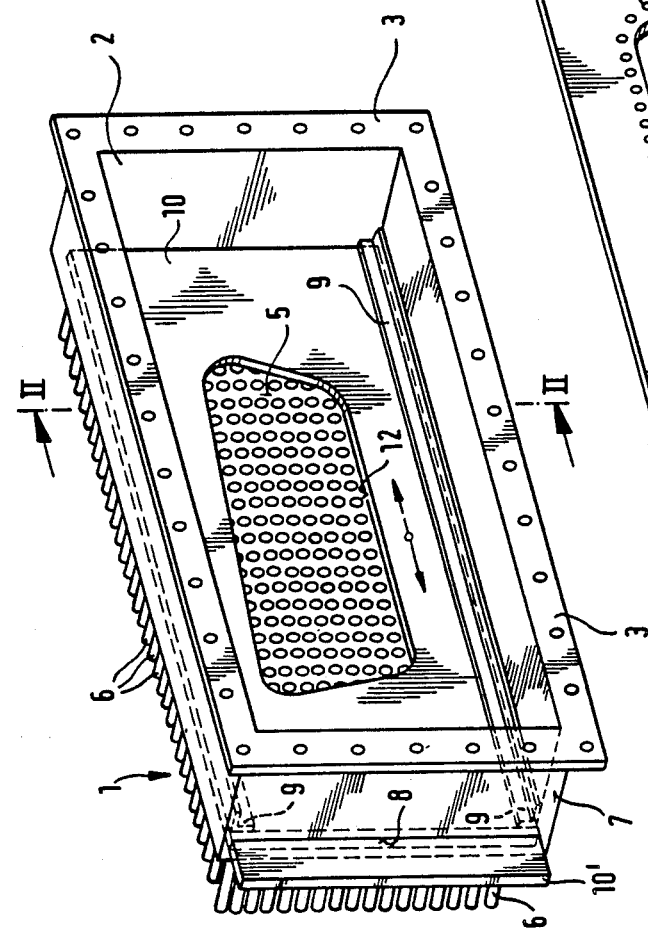
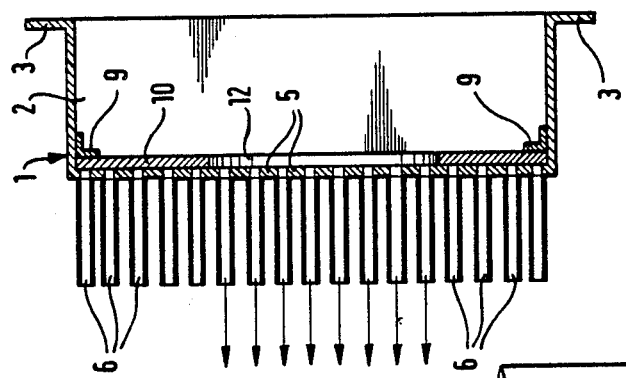
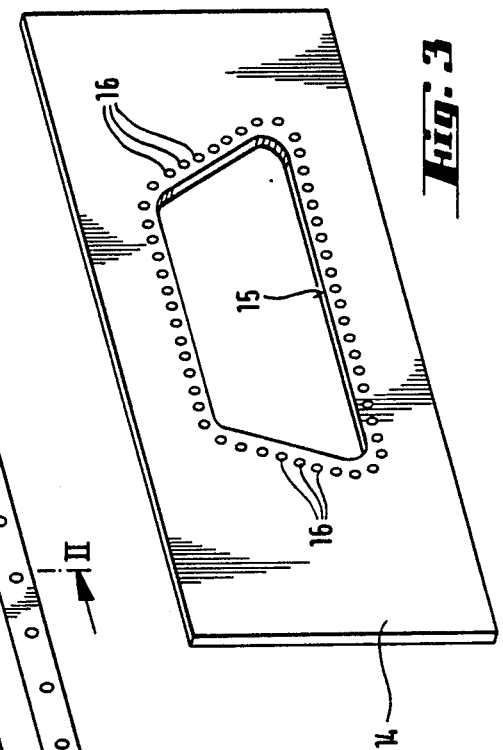

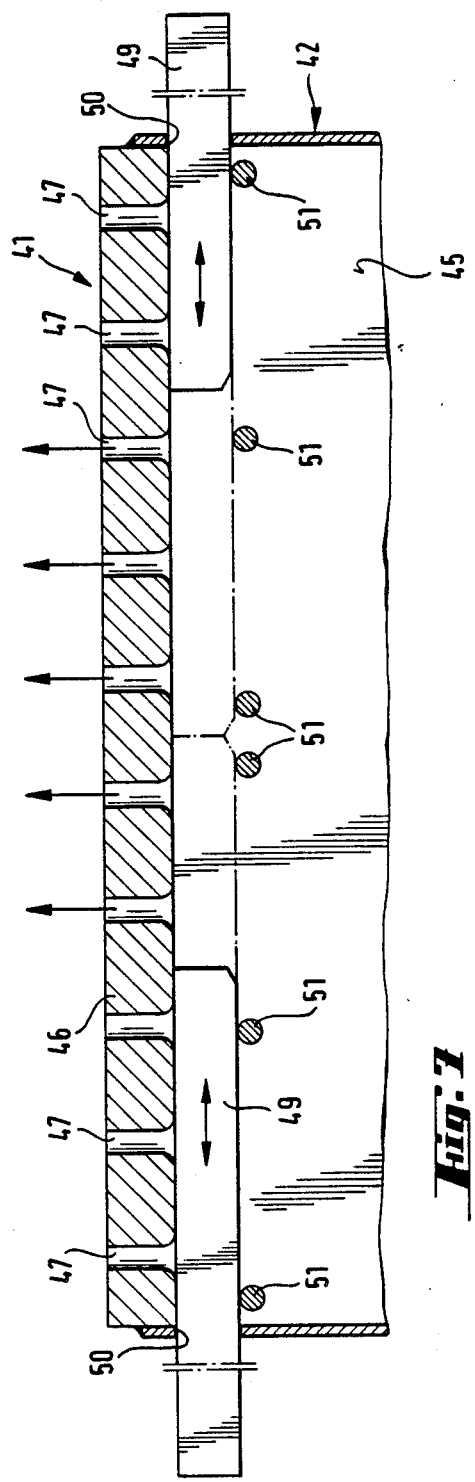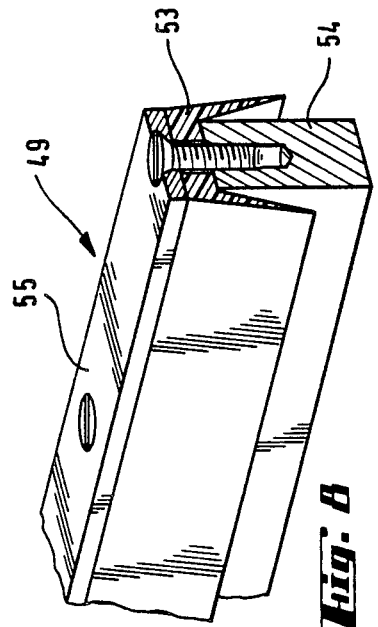
Fig. 7
Fig. 8

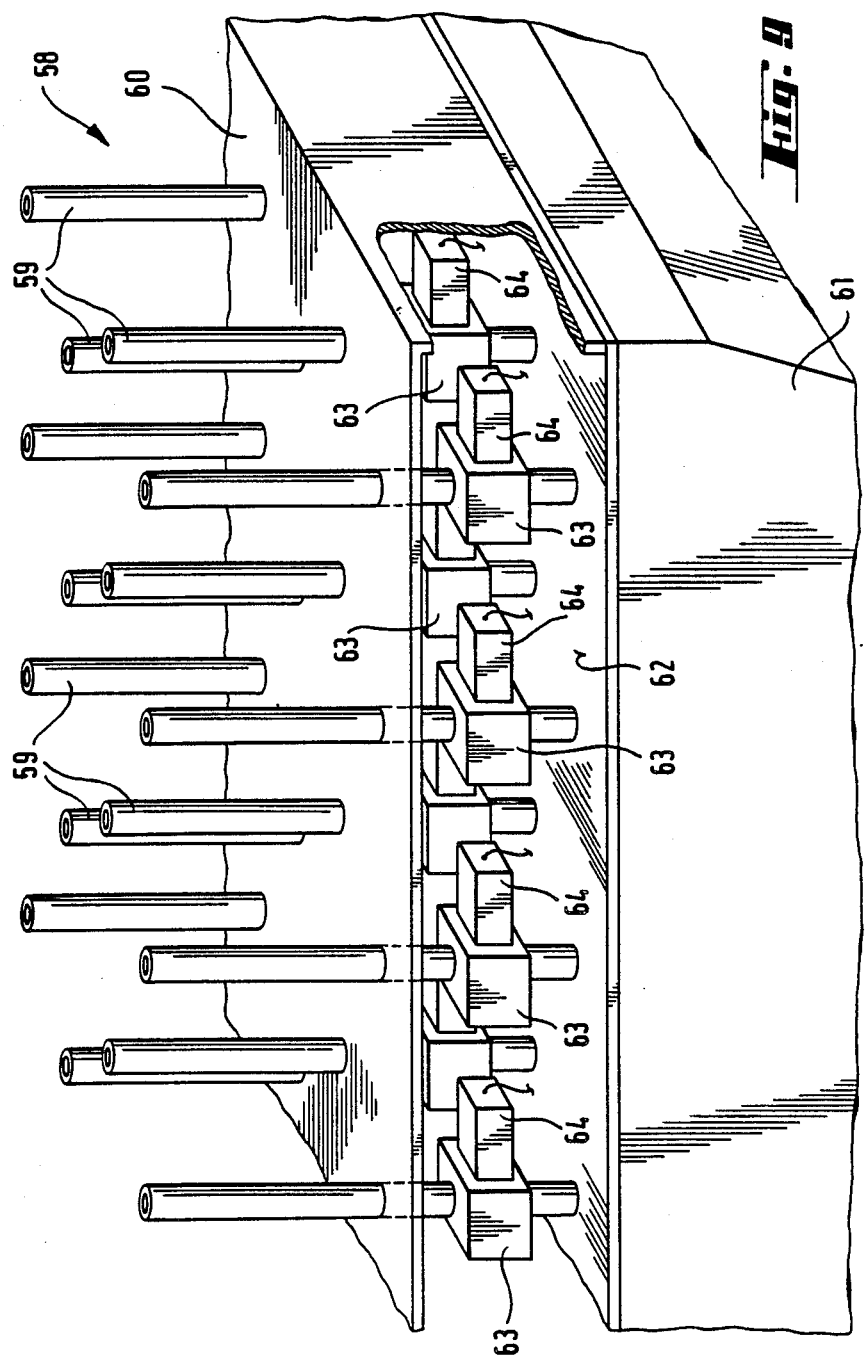

BLOW BOX FOR GLASS TEMPERING

This is a division of application Ser. No. 079,039,026, filed Apr. 16, 1987 now Pat. No. 4,816,058.

BACKGROUND OF THE INVENTION

1. Field of the Invention

The invention relates to an apparatus for the thermal tempering of panes of glass, having two blow boxes arranged opposite one another, each having a plurality of blow nozzles.

2. Background of the Prior Art

Tempering devices of this type are primarily used for the manufacture of safety glass for motor vehicles. They are known in various embodiments. Thus, for example, one known blow box is made from an air distribution box, the front plate of which is provided with a plurality of air discharge openings. An example for the construction of such a blow box is shown in DE-OS 14 71 820. In order to create better conditions for the necessary flow of the air after it impinges on the hot glass panes, however, this type of blow box consisting of an air distribution box and a front plate provided with air discharge openings often has a front plate provided with nozzle pipelets between which the hot air can flow laterally. A blow box of this type is shown, for example, in DE-AS No. 24 08 084. Other blow boxes provide projecting nozzle webs which extend laterally over the blow boxes, in which the air discharge openings are formed in the nozzle webs, and whereby the flow of the hot air takes place through the intermediate spaces between the nozzle webs. Blow boxes with this construction are described, for example, in DE-AS No. 23 33 924 and DE-OS No. 34 25 809.

It is also known to adapt the air discharge area formed by the air discharge openings or by the openings of the blow pipelets to the shape of the glass panes if the glass panes to be tempered are curved. In this way it is intended that the air discharge openings overall have the same spacing from the glass surface, and that a uniform tempering is achieved in this manner over the entire surface of the glass.

It is also known, for economic reasons, to temper the glass panes with blow boxes corresponding to their size. However, because re-equipping a tempering device by exchanging the blow boxes is a time-consuming process, in practice large blow boxes are generally used which are designed for the largest glass panes they will handle. In so doing, it is simply accepted that a portion of the compressed air for the tempering of the glass is not used when smaller glass pieces are tempered.

SUMMARY OF THE INVENTION

An object of the invention is to form blow boxes of the described type in such a manner that they are able to handle the tempering of large-surface glass panes on the one hand, and on the other hand also operate with a high degree of effectiveness on smaller glass panes.

According to the invention this object is achieved in that the air supply to selected blow nozzles or blow nozzle groups in a blow box designed for relatively large glass panes and having an area of the blow box occupied with blow nozzles can be blocked at least in the edge areas of the area occupied with blow nozzles in dependence on the shape and size of the glass panes to be tempered.

In the realization of the teachings according to the invention, for which various exemplary embodiments are described below, not only can the tempering process be optimized, in that with small panes the cooling and the flow conditions are improved, but also significant cost savings can also be attained thereby. If one takes into account, that in an industrial tempering system the cooling process is the area with the highest energy consumption, then it is obvious that by means of the invention the consumption of compressed air can be significantly reduced, thereby significantly lowering costs.

According to a first embodiment of the invention, the blow box is designed in such a manner that by means of exchangeable template slides, the openings of which correspond to the shape and surface of the glass panes to be tempered, the desired nozzle openings in the edge area of the nozzle field are blocked from the supply of air.

In another embodiment, in which the nozzle field is formed by separate nozzle webs, the invention concept is realized in that the two frontal sides of nozzle webs are provided with insert openings for sealing rods, which, in dependence on the depth of insertion, close the desired number of air discharge openings.

It is also possible to control each nozzle individually, and to open and close them in dependence on the size and shape of the pane, whereby in this case each nozzle is connected with an air distribution box by means of a tube connection, and a separate controllable valve is arranged in every tube connection. In further developing this embodiment, it might even be possible to automatically vary the size of the blow surface in dependence on the size and shape of each individual glass pane, through, for example, a control program provided with which the described valves are controlled automatically. Various exemplary embodiments for the blow box designed according to the invention are described in greater detail below with the aid of the drawings.

BRIEF DESCRIPTION OF THE DRAWINGS

FIG. 1—A blow box equipped with nozzle pipelets, and having a template-like slide to cover the unneeded nozzle pipelets, in a rear perspective view;

FIG. 2—The blow box illustrated in FIG. 1 in a vertical section (plane II—II);

FIG. 3—A template slide block which permits a limited reduction of the air pressure in the edge area of the glass pane;

FIG. 7—A longitudinal section along the plane VII—VII in FIG. 6;

FIG. 8—The construction of a blocking bar used with a blow box provided with nozzle webs, and FIG. 9 A blow box in which each blow nozzle is provided with an individual blocking valve.

DETAILED DESCRIPTION OF THE INVENTION

Figure 4:
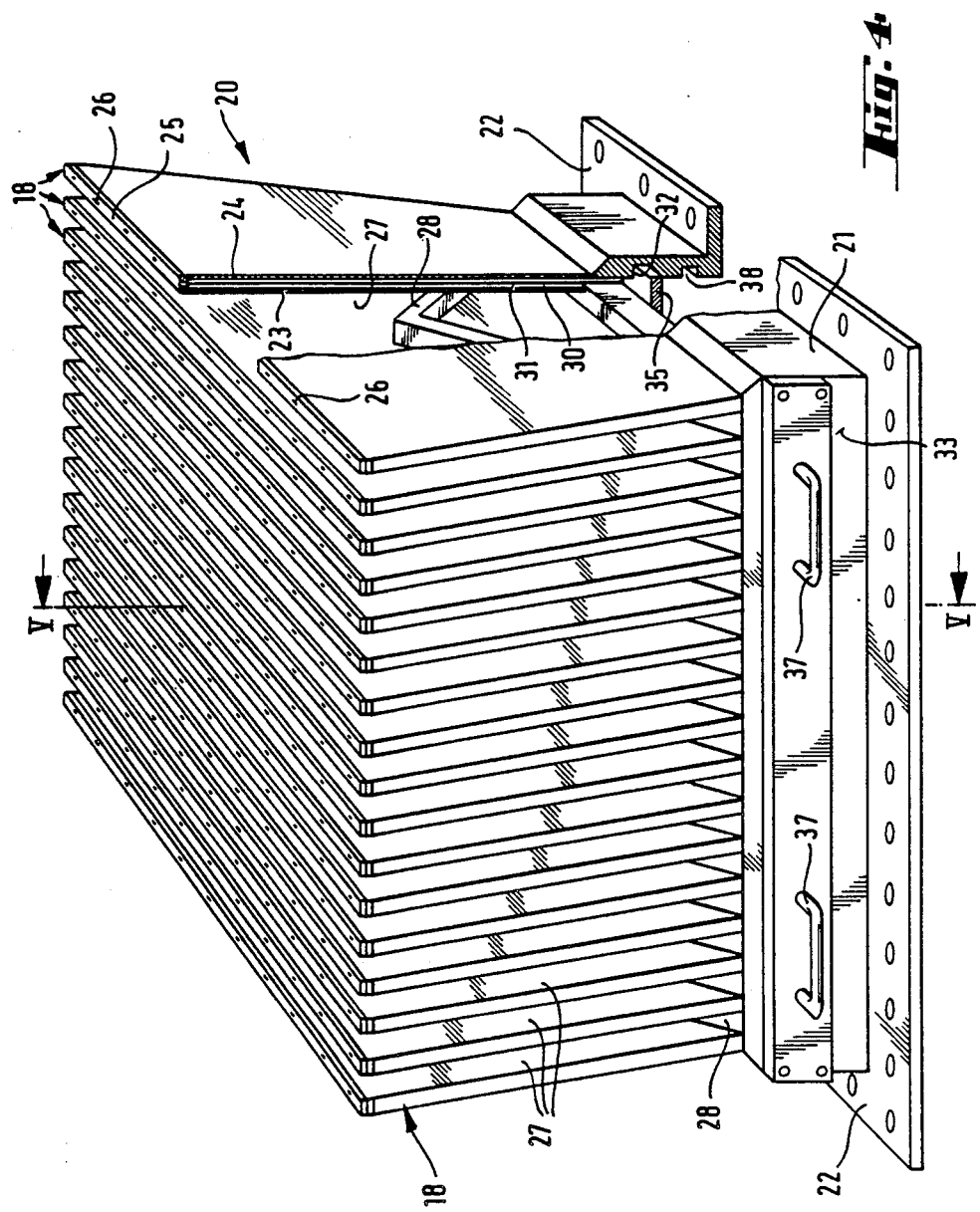
FIG. 4—A blow box constructed from nozzle webs having a template-like slide block for the unneeded nozzle pipelets, in a perspective view.

The blow box 1 illustrated in FIGS. 1 and 2 has an air distribution box 2 with a large cross section, the open side of which is screwed to a corresponding box or frame by means of a flange 3, and the box or frame, in turn, is connected to the ventilator delivering the compressed air by means of suitable pipe conduits. The air distribution box 2 is closed on its front side by a front plate 5, in which there are arranged a plurality of outwardly projecting nozzle pipelets 6. The nozzle pipelets 6 are provided with compressed air by means of the air distribution box 2.

Immediately in front of the front plate 5 an opening 8 is provided in the side wall 7 of the air distribution box 2, which opening extends over the entire width of the blow box, and within the distribution box 2, rails 9 are arranged parallel to and slightly spaced from the front plate 5. The opening 8 and the rails 9 form a guide slot adjacent the front plate 5 to receive a plate-like slide block 10. The slide block 10 projects laterally out of the opening 8 to such an extent that the projecting portion 10' can be grasped to remove the slide block 10, in order to exchange it for another slide block as needed.

The slide block 10 consists of a metal plate and has an opening 12 corresponding to the shape and size of the glass pane to be tempered with this blow box. The slide block 12 blocks the nozzle pipelet 6 lying in the edge area of the front plate 5 from the air supply and only leaves those blow nozzles free which lie within the opening 12. In this manner only those nozzle pipelets 6 which lie directly opposite the glass pane to be tempered are subjected to compressed air, while the nozzle pipelets 6 arranged outside this area are blocked from the air supply.

FIG. 3 shows a slide block 14 with a template-like opening 15, corresponding to a different glass shape. In this slide block 14 the opening 15 is smaller than glass pane for which this slide block is used, and a series of holes 16 are provided in the metal plate around the opening 15. In this manner the quantity of the compressed air in the edge area of the glass pane can be reduced to a desired amount if that should prove to be desirable. A reduction of the cooling effect of this type in the edge area of the glass panes is generally desirable, because under uniform air flow the edge area of the tempered glass is subjected to greater compression tempering than the central area of the glass pane, due to the increased heat dissipation over the edge of the glass pane and due to "drum skin tensions" that form in any tempering process. A slide block 14 according to FIG. 3 to a large degree and in a simple manner compensates for this effect of increased edge tempering.

FIG. 4 shows a side view of a blow box 20 provided with nozzle webs 18, in which the nozzle webs 18 open into an air distribution box 21. This air distribution box 21 is provided with an annular flange 22 by means of which the blow box 20 is connected to a corresponding annular flange on the end of the air supply system. The individual nozzle webs 18 are formed by side walls 23, 24 made from metal, i.e., sheet metal plates. The tops of the nozzle webs 18 are closed by strips 25 in which bores 26 are arranged at desired intervals to form the blow openings. The compressed air heated by exchange with the hot glass panes flows through the intermediate spaces 27 between the nozzle webs 18. Roof-like strips 28 are provided in the lower portion of these intermediate chambers 27 in the lower blow box of a horizontally disposed tempering apparatus. Any glass shards falling between the nozzle webs 18 as a result of a breaking glass pane slide outward on the inclined surfaces formed by the strips 28, so that the intermediate spaces 27 do not become clogged thereby, but rather the unhindered continuing flow of air through these intermediate chambers is assured.

Figure 5:
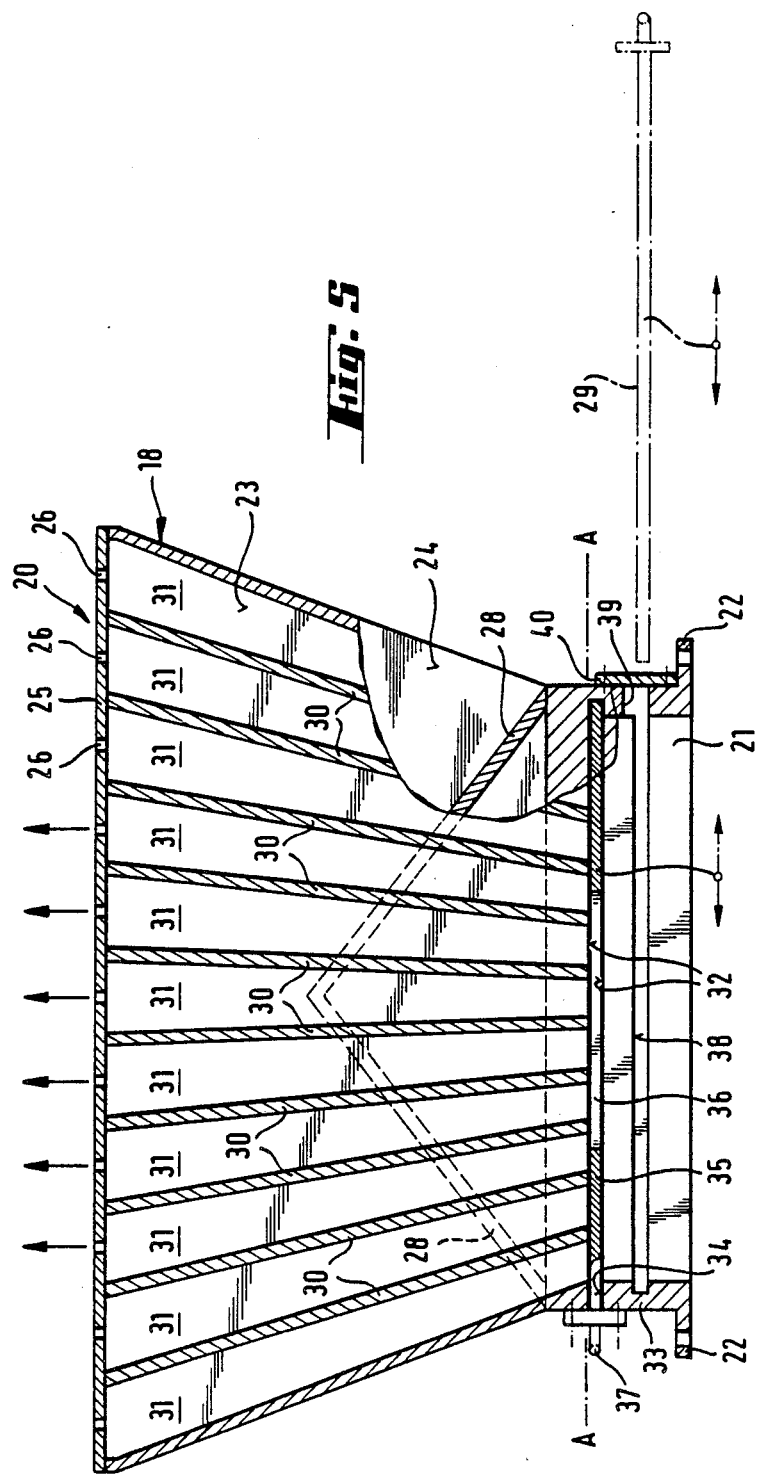
FIG. 5—The blow box illustrated in FIG. 4 in a section along the plane V—V.

Each individual nozzle web 18, as can be seen in FIG. 5, is divided by intermediate walls 30 in such a manner that each nozzle bore 26 is supplied with compressed air by its own channel 31. All of the channels 31 of the entire blow box 20 open in a plane A—A, whereby these openings of the channels 31 form a grid corresponding to the grid formed by the blow nozzles 26.

Beneath the opening plane A—A, a guide slot 32 is arranged within the air distribution box 21 and an opening 34 extends over the entire width of the air distribution box. A template-like slide block 35 is pushed through the slot 34 from the outside, guided in guide slot 32. This slide block 35, in turn, is provided with a cut-out 36 corresponding to the size and shape of the glass pane to be tempered, so that, again, only those nozzle bores 26 are subjected to compressed air which align with the cut-out 36, while the remaining channels 31 and nozzle bores 26 are blocked from the air distribution box 21. With the aid of suitable hand grips 37, the slide block 35 can be removed like a drawer, as necessary, and exchanged for a different slide block. Since a portion of the nozzle bores 26 are not subject to the compressed air during the blowing process and since occasionally a glass pane fractures into small pieces during the blowing process, it can sometimes occur in the lower blow box of a horizontally disposed tempering apparatus that small glass particles fall through the nozzle bores 26 and the channels 31 onto the slide block plate 35. As the slide block 35 is removed, these small glass particles are held by the intermediate walls 30 and fall into the air distribution box and thus into the pipe system, so that when the compressed air is turned on they can cause difficulties. In order to preclude this danger, an additional guide slot 38 is provided inside the air distribution box 21 beneath the guide slot 32, into which additional guide slot 38 a glass particle collection sheet 29 can be inserted through the opening 39 before the slide block 35 is removed, so that the glass particles are caught by this collection sheet 29. The collection sheet with the glass particles is then removed through the relatively high opening 39. The opening 39 is subsequently reclosed by a sealing strip 40.

Figure 6:
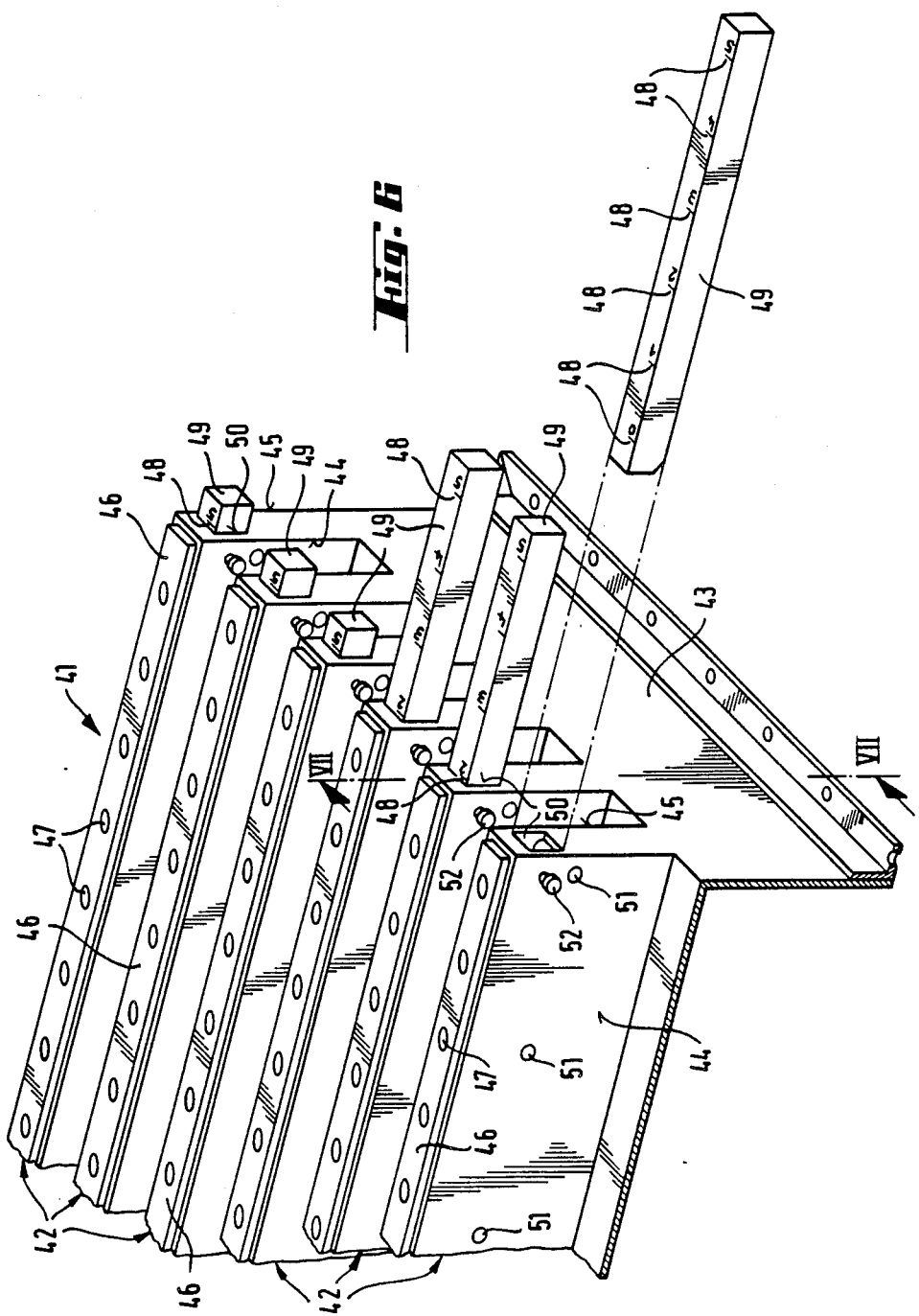
FIG. 6—A blow box provided with nozzle webs having individual sealing rods for the nozzle openings in the nozzle webs.

An additional possibility for realization of the invention with a blow box having nozzle webs is illustrated in FIGS. 6 through 8. In this instance the insides of the individual nozzle webs 42 of a blow box 41 are not divided by intermediate walls, but rather open over their entire longitudinal extension into the air distribution box 43. Each nozzle web 42 thus consists of side walls 44, 45 and an upper closure strip 46, in which bore holes 47 are provided as blow nozzle openings. The unneeded nozzle openings 47 in this case are blocked from the compressed air supply by sealing rods 49, in that these sealing rods 49 are introduced into the nozzle web from both sides of each nozzle web 42 through respective openings 50 far enough to close off the desired outer nozzle openings 47. While the sealing rods 49 sealingly lie immediately against the smooth underside of the closing strip 46, they are supported underneath on bolts 51 which are fixed in the side walls 44, 45 of the nozzle webs. As assistance for the adjustment of the sealing rods 49, a scalelike marking system 48 can be arranged, for example, on the upper side of the sealing rods 49, which marking works together with the edge of the opening 50 to indicate the length of the covered portion of the respective nozzle web 42. In addition, clamp screws 52 can be provided to fix the positions of the sealing rods 49.

Furthermore, with this apparatus the area of the nozzles subjected to compressed air can be reduced in size as desired from the outside toward the inside, and can adapt to any desired shape and size of the glass panes.

If a particularly good seal of the nozzle openings is needed, the sealing rods 49 can be provided with an additional sealing cross-sectional shape 53, as illustrated in FIG. 8. This sealing cross-sectional shape 53 made from a rubber-like material with a U-shaped cross section is attached to the metal strip 54 in such a manner that the two side shanks of the shaped strip are directed against the direction of air flow, and under the effect of the air pressure they act as sealing lips lying against the side walls of the nozzle web. The attachment of the sealing strip 53 is accomplished by means of a flat strip 55 placed on the outside of the center web, which flat strip 55 is screwed to the metal strip 54 through the center web of the sealing strip 53. This flat strip 55 is made, for example of metal, thus providing an additional mechanical protection to the sealing strip 53 against small glass splinters falling into the nozzle openings 47. Instead of the attachment with screws, it can also be accomplished by means of gluing, in that on one side the center web of the sealing strip 53 is glued to the metal strip 54, and on the other side the flat strip 55 is glued to the center web of the sealing strip 53.

The embodiment of a blow box 58 according to the invention as illustrated in FIG. 9, is distinguished in that each individual blow pipelet 59, or at least the blow pipelets 59 arranged in the edge areas of the front plate 60, can be blocked from the compressed air supply individually and independently of each other. For this purpose the blox pipelets 59 opening into the air distribution box 61 and held there in the wall 62 are each provided with a valve 63, which, for example, is activated electrically by means of an electromagnetic control 64. With the aid of a suitable program control, not only can blow nozzle groups of a desired shape and size be formed in this manner, but a blow box 58 of this type also has the advantage that the rearrangement for a different pane size can be achieved almost instantaneously. A blow box 58 of this type is therefore particularly suited for use in an fabrication line in which small series with different glass panes are tempered, or in which even the individual successive glass panes have different shapes and sizes. In such a fabrication line, in which the other method parameters such as furnace heating, transport speed, etc. are also controlled by a central control system in dependence on the size and shape of the glass panes, the described blow box 58 can be optimally adapted independently by the central control unit to the individual glass panes.

If, with the aid of a large blow box, two or more small glass panes are to be tempered simultaneously, it is advantageous, using the measures according to the invention, to supply only the areas of the blow nozzle area with compressed air corresponding to the individual glass panes. This can be accomplished with all of the described embodiments. Accordingly, the individual areas can be completely separated from each other. Thus, for example, with the use of a large surface slide block, two or more separate openings can be provided, each of which is adapted to the position of its associated individual glass pane in the blowing apparatus, as well as its shape and size. Similarly, the same result can also be achieved with the other embodiments with the respective described means.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for thermally tempering a pane or panes of glass, comprising: first and second oppositely situated and spaced-apart blow boxes and means for supplying air under pressure to each, each said below box comprising an air distribution box and a series of spaced-apart nozzle webs extending over the entire width of said air distribution box, each said nozzle web defined by opposed major side walls extending the length of said distribution box, an upper closure strip in which bore holes are provided, and frontal and rear plates attached to said side walls, said side walls bearing, on the opposed interior faces supports for a sealing rod which can be introduced through an opening in said frontal and rear plate, a sealing rod for each nozzle web which may be inserted in said opening, and thereby occlude at least one bore hole in said closure strip, said sealing rods being supported against said closure strip by said support means so as to block the air supply to said occluded bores when inserted, and means for supplying said panes to the space between said first and second blow boxes.

2. The apparatus of claim 1, wherein said sealing rods comprise an upper sealing means of elastomeric material, which, when said sealing rod is inserted, lies between said sealing rod and said upper closure strip.

* * * * *